United States Patent [19]
Rooker

[11] 4,268,277
[45] May 19, 1981

[54] MULTI-TUBULAR CENTRIFUGAL LIQUID SEPARATOR AND METHOD OF SEPARATION

[75] Inventor: Mitchel L. Rooker, Tulsa, Okla.

[73] Assignee: Combustion Engineering, Inc., Windsor, Conn.

[21] Appl. No.: 79,017

[22] Filed: Sep. 26, 1979

Related U.S. Application Data

[63] Continuation-in-part of Ser. No. 942,256, Sep. 14, 1978, abandoned.

[51] Int. Cl.³ .............................................. B01D 45/12
[52] U.S. Cl. .......................................... 55/1; 55/398; 55/452; 55/457; 55/347; 55/348
[58] Field of Search ................. 55/201, 346, 347, 398, 55/452, 455, 456, 457, 1, 426

[56] References Cited
U.S. PATENT DOCUMENTS

| | | | |
|---|---|---|---|
| 867,240 | 10/1907 | Brunner et al. | 55/452 |
| 1,784,627 | 12/1930 | Hamill | 55/452 |
| 2,418,381 | 4/1947 | Wegmann | 55/398 |
| 2,425,588 | 8/1947 | Alexander | 55/452 |
| 3,251,176 | 5/1966 | Gleason | 55/452 |
| 3,481,118 | 12/1969 | Willis et al. | 55/338 |
| 3,614,863 | 10/1971 | Patterson et al. | 55/452 |
| 3,977,850 | 8/1976 | Hill | 55/419 |
| 4,162,150 | 7/1979 | Carson | 55/452 |

*Primary Examiner*—David L. Lacey
*Attorney, Agent, or Firm*—Arthur L. Wade

[57] ABSTRACT

A tube receives a liquid-gas mixture into a first end. Blades are mounted at the first end of the tube and the gas-liquid mixture impinges on the blades and is directed by the blades into a vortex within the tube. Openings in the tube wall conduct the liquid thrown against the interior of the wall into a casing formed over the wall openings. The gas, separated from the liquid, is passed from the second end of the tube while the liquid separated from the gas and collected in the annulus between the external wall of the tube and the casing over the wall openings is discharged.

5 Claims, 6 Drawing Figures

MULTI-TUBULAR CENTRIFUGAL LIQUID SEPARATOR AND METHOD OF SEPARATION

BACKGROUND OF THE INVENTION

This application is a continuation-in-part of application Ser. No. 942,256 filed Sept. 14, 1978, now abandoned.

FIELD OF THE INVENTION

The present invention relates to a tubular form of gas-liquid separator, in which a gas-liquid mixture is introduced into one end of the tube with centrifugal force to flow the liquid from the mixture and through a plurality of openings, which penetrate the wall of the tube along the length of the tube. More specifically, the present invention relates to openings of a size, number and distribution in the wall of a tubular centrifugal separator, which will effectively extract liquid from the cylinder.

DESCRIPTION OF THE PRIOR ART

As hinted in U.S. Pat. No. 3,977,850, the disclosure of U.S. Pat. No. 3,481,118, assigned on its face to Porta-Test Manufacturing, Ltd., Edmonton, Alberta, Canada, is evidently the original ancestor of tubular centrifugal gas-liquid separators, employing a continuous gap in the wall of the tube, through which liquids forced from the entraining gas to the internal wall of the tube by the centrifugal force flow, along with a portion of the gas, referred to as carrier gas. Admittedly, in the specification disclosure of U.S. Pat. No. 3,481,118, the continuous gap 31 is defined as the space between the sections 28 and 29 of vortex finder 7. Therefore, whether the gap 31 is looked upon as a continuous gap in a single tube or the space between two sections of the same tube, it is clear that liquid thrown to the internal wall will flow out of this gap-space along with some of the gas, while the larger portion of the gas, now separated from the liquid, passes out of the tube. Further, this original disclosure contemplated the forced carrier gas in conduit 35 being recycled from suction chamber 27 to a position of low pressure at the entrance to the vortex finder tube 7, to again have liquids centrifuged from it to the vortex finder tube wall.

Subsequent developments in the art selected various low pressure stations in the system, at which the forced carrier gas was recycled into the system. The liquid removal efficiency of the single, continuous stepped gap has never been seriously questioned. It is suspected that any measures of efficiency were carried out at, or near, atmospheric pressure. At the most, it was contemplated by such disclosures as U.S. Pat. No. 3,977,850 that two or three continuous gaps would produce processed gas with only one-tenth of a gallon of liquid per MMSCF of gas.

Subsequent investigation at elevated pressures have exploded these complacent assumptions. Liquids are not forced smoothly from the internal wall of the tubular separator, urged by a portion of the gas as carrier gas. At even the stepped gap wall opening of U.S. Pat. No. 3,481,118, the chaos of disruption in the fluid flow causes the laminar flow of liquid on the internal wall to be disrupted and splatter, with much of the splattering liquids being re-entrained by the gas which flows around the wall opening to appear as carryover from the separator. The decrease in liquid removal efficiency becomes more evident as the pressures exceed 100 psig.

Meanwhile, in the face of this reality, the commercial structures embodying the old Porta-Test plan, are unrealistically advertised as meeting the specification of reducing liquid content to the gas to one-tenth of a gallon per MMSCF.

Therefore, for the purpose of emphasizing the advance made by the present invention, the highwater mark of the art is defined as providing at least the equivalent of one, and not more than two or three, continuous gaps, with each gap width not less than $\frac{1}{8}''$ and not more than $\frac{1}{2}''$, as exits for both liquid and recycled carrier gas. Inherent within this limitation of the present art, are the problems of distribution of carrier gas and resultant proportioning of liquid removal efficiency between the individual gaps. These limitations of the present art result in a significant short fall of the oil field standards for liquid-from-gas separation of 0.1 gallon per MMSCF.

In this art, there is first needed a number, form, size and distribution of openings in the walls of cylindrical, tubular, centrifugal separators, which will more efficiently separate liquid and gas than the prior art. Further, there is needed a drainage structure for multi-tubular combinations, which will prevent the return of liquid to the tubes for reentrainment by the gas.

There are two general approaches which may be made to solve the problem of increasing the efficiency of this type of separator. In a direct comparative sense, the number, size and distribution of wall openings required to obtain 0.1 gallon per MMSCF may be defined as a multiple of the opening embodied in one of the single continuous gaps of the disclosures of the prior art recited above. An intriguing alternative is to relate the openings required to another physical dimension of the tube, such as its diameter. In the first technique, the prior art employment of a continuous wall gap, having a width of $\frac{1}{8}''$ to $\frac{1}{2}''$, could be recited as a base for defining the gaps required as a multiple thereof.

In the second technique, the total area of wall openings would be a stipulated ratio of the diameter of the tube, as an example. In either technique, there is a problem of finding the wall opening system, which will efficiently separate the gas and liquid of mixtures to be processed.

SUMMARY OF THE INVENTION

The present invention contemplates a liquid-gas separator of the cylindrical, tubular, centrifugal type, wherein the mixture is directed into one end of the tubular separator, and is vortexed to force the liquid component of the mixture to the internal wall of the hollow cylinder. The hollow cylinder wall is provided with a plurality of openings with a total area that provides a high efficiency of separation of the liquid and gas of the mixture.

The invention further contemplates a gas-tight casing provided about the wall openings, in which the pressure is maintained substantially equal to the pressure on the internal wall of the tubular separator, and from which a liquid drain withdraws collected liquid in separation from the gas of the mixture.

The invention further contemplates the total area of the wall openings as a large multiple of the area of a single, continuous gap in the hollow cylinder wall.

The invention further contemplates a plurality of tubular separators in orientation with baffles mounted between the separators to provide a drain surface for liquids from the openings.

Other objects, advantages and features of the invention will become apparent to one skilled in the art upon consideration of the written specification, appended claims, and accompanying drawings.

DESCRIPTION OF THE PREFERRED EMBODIMENT

General Analysis

Figure 1:
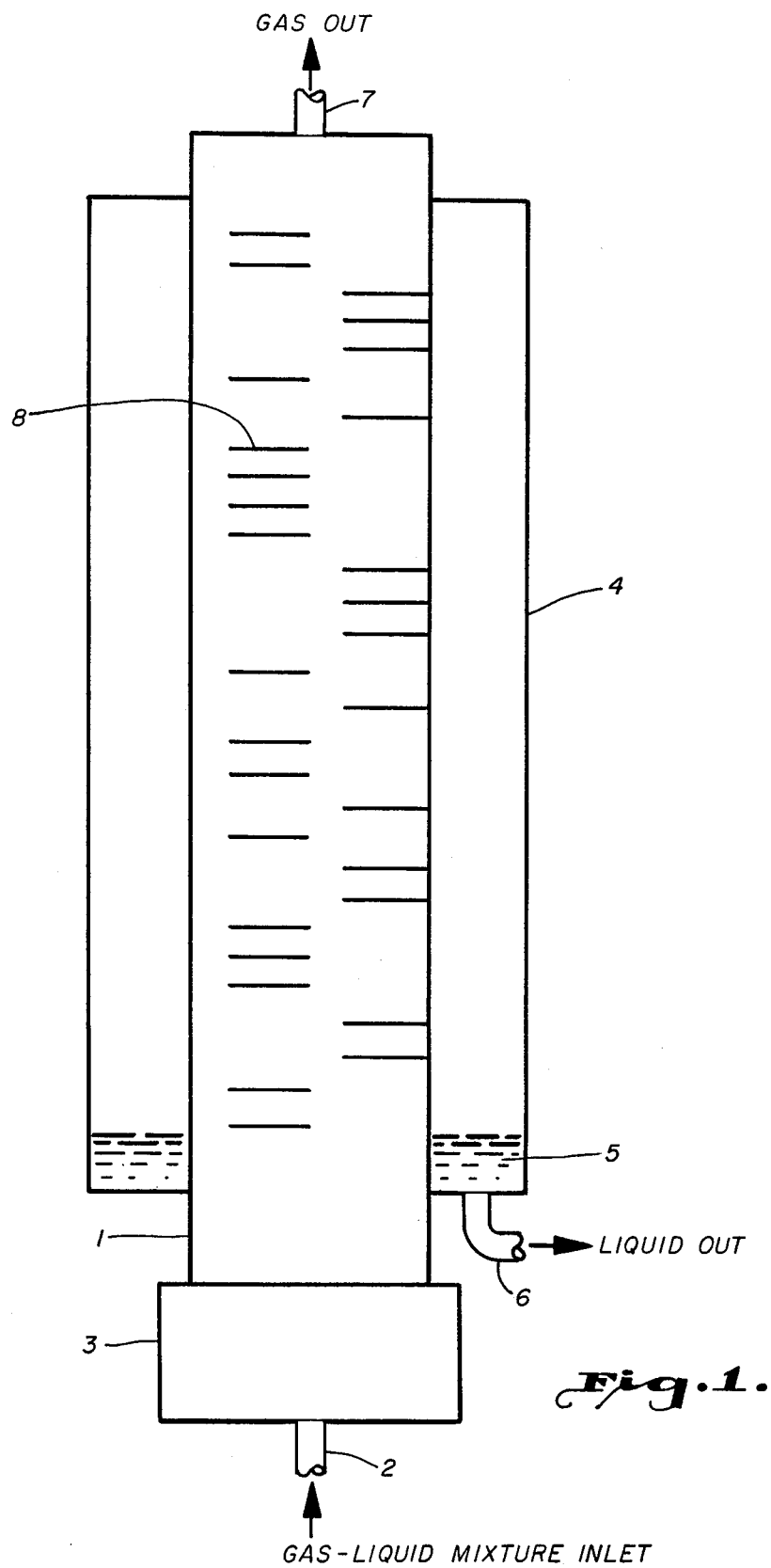
FIG. 1 is a sectioned elevation of a tubular, centrifugal gas-liquid separator, in which the present invention is embodied.

A reappraisal of the cylindrical, tubular, centrifugal type of separator, using one, two or three gaps, reveals that the velocity of the vortexed gases introduced into the tube are in the range of 40–65 FPS, with 65 FPS being a typical value. With this velocity of gas over the spiralled liquid, the surface of the liquid was seldom smooth. The velocity head pressure can be extremely high on the film of liquid thrown to the internal wall of the hollow cylinder. The liquids thrown to the wall formed a spiral pattern, with a high degree of force between the liquid surface and the gases.

The velocity of the liquids, driven by the gas, was so great that the liquids would readily jump a gap in the wall of the tubular surface. Therefore, it appeared that the stepped gap pioneered in the Porta-Test patent disclosure would readily shave, or skim, this liquid from the wall with laminar flow to outside the wall. In view of this theory, it was surprising to discover that the stepped gap actually created a chaotic condition, which disrupted the laminar flow of the liquids through the gap, and that under these chaotic flow conditions, a portion of the gas flowed around the gap, taking liquid with it. This bypass of the liquid around the gap was found to increase greatly with increased operating pressure and velocity of the mixture vortexed through the cylindrical tube. Velocities of 30 to 160 FPS were observed as throwing liquid from the gaps, but also leaving higher portions of the liquid in the gas flowing through the tubular separator. As gas spiralling velocities increased from 30 to 160 FPS, liquid carryover was also observed to increase. It was suddenly realized, at the end of these tests, that a number of gaps could be determined, which would provide a satisfactory overall efficiency of liquid removal. Further, it evolved that it was unnecessary to provide for recycle of carrier gas to attain the efficiency. The liquid, under the force of the vortex, was thrown through the wall openings, although the differential pressure across the openings was maintained quite small, or substantially nonexistent. Whatever gas was flowed through these openings was quickly returned through the same, or other openings, when a gas-tight chamber was provided over the openings. In other words, there was no carrier gas to recycle.

The art that developed after the Porta-Test system limited itself to struggling with adapting only one, two or three full, or continuous, gaps in the wall of the cylindrical, tubular separator.

This limited system of the one-two-three gaps requires that each of these limited number of gaps must have a high efficiency of liquid removal, with a high forced carrier gas rate per inch of gap length. Further, the carrier gas must be carefully divided between the gaps. Within this system, the point is quickly reached where the amount of forced carrier gas to be recycled upsets the separation in an annulus created by a casing provided about the gaps. Therefore, the balancing of the amount of gas flowed through the limited number of continuous gaps is a continuous engineering problem, and is further complicated by the disruption of the spiral liquid flow on the internal wall of the tube, the spirals being weakened by each gap. It is a conception of the invention that a large gap area must be provided, as compared to the area of a single, continuous, full gap of the prior art, in order to obtain the overall efficiency required of this type of separating system.

More specifically, under this concept, is the discovery that opening arrangement in the wall of the tube separator must basically provide a size at least greater than that of ten continuous gaps. Valid as this statement is, it inherently skirts close to being indefinite. Precision demands clear definition of the size of the area of prior art gaps, of which the area of the new gap system is a multiple.

Reduction to practice in the prior art utilized 1, 2, or 3 full, continuous gaps. But the width of these gaps was varied from about ⅛" to as high as ½". The present invention calls for a total area of openings at least ten times that of a single ⅛" width continuous gap. This gives a degree of stability to the definition of the invention, particularly if the invention uses openings of substantially ⅛" width. These openings are under the concept of the invention if they are rectangular in shape, ⅛" in width and are distributed along the separator tube length until a total area is obtained equal to at least ten times the area of ⅛" continuous gap of the prior art. However, the prior art gaps are not simply limited to a ⅛" width, but may be ¼" or even as great as ½".

On one end of the inventive concept, the invention may be compared to a single ⅛" continuous gap of the prior art. Admittedly, however, the minimum multiple of prior art gaps, whose widths are greater than ⅛", is not precisely related by data available from tests of reductions to practice.

More precision in the definition of the inventive concept appears available in simple duplication of openings in the wall of the separator tube until the desired efficiency of separation is obtained. Of course, the tube is not limited to a 3" diameter size. Sizes presently range from 3" to 6". With each size, there is some total area of openings with which the desired efficiency can be obtained. Therefore, defining the area in a ratio relation with the diameter of the tube is certainly a definite system for teaching the invention.

In exemplification of this contrast with the prior art, the 3" diameter tubular separator is used. A reasonable assumption is that the limited number of prior art gaps each have widths of substantially ⅛". Therefore, a rather specific gap area is available, with which to contrast the prior art. From this basic concept of the present invention, the wall can be provided with openings or gaps, which are approximately ⅛" in width, but whose total length is at least ten times that of the continuous gap of the prior art.

Reducing the basic concept of the invention to practice, it is observed that a large number of openings which provide the large area, compared to the prior art, would each have a relatively low efficiency in liquid removal. However, the openings could be distributed along a length of the tubular separator and provide the overall efficiency required.

An auxiliary discovery was that there is really no need to coordinate liquid flow through the wall openings of the separator tube with the carrier gas also flowing through the openings. In the first aspect, the invention is broadly that of adding opening area far beyond that of the prior art. If enough area was provided by the addition of a sufficient number of openings, carrier gas became relatively unimportant as a factor in forcing liquid through the increased number of openings. Each of the openings has a relatively low level of efficiency. The overall efficiency was gained by simply adding openings. Thus, the forced carrier gas of the prior art fades as a factor in the transport of liquid through the wall openings.

As the increased number of wall openings render the forced carrier gas impotent, there was a discovery that elimination of carrier gas would significantly simplify a reduction to practice of the invention. True, some small amount of gas is forced through the wall openings and into the gas-tight chamber provided. However, this small amount of gas entered the annulus between the separator tube and the casing, despite the fact that the differential pressure across the openings was small, or substantially non-existent. It is obvious to the observer that the gas either comes right back through the same openings it entered from the separator tube, or re-enters the tube through one of the other openings. Therefore, under the concepts of the present invention, and with the gas-tight casing, no provision is needed to draw off forced carrier gas and conduct it to a low pressure point in the system.

It must be emphasized that the path provided between the inside of the cylindrical tube of the separator and the annulus provided by an external casing over the paths, may be variously referred to as gaps, holes, openings, slots, etc. The invention is concerned with the number, shape, and distribution of these paths through the wall of the separator tube. But let no inconsistency in the use of these terms obscure their function within the concept of the invention.

Admonitions concerning misunderstandings are also directed to references to the gas, which flows through the paths, whether considering the prior art, or the present embodiment of the invention. The prior art has been exclusively concerned with deliberately passing a portion of the liquid-entraining gas through the wall openings with the liquid forced through the openings and recycling this gas. This gas passing through the openings is dubbed forced carrier gas, and is conducted to a low pressure point in the system, to join the separated gas. This is the arrangement of the prior art obviated in the present invention. In contrast, the present invention has a portion of the gas flowing out of the wall openings with the liquid, but returning quickly to the tube interior. This gas is properly termed as naturally flowing out of the tube and returning thereto by the shortest practical route.

Hopefully, there remain only minor problems of terminology in the disclosure and common sense application of the terms will keep the disclosure clear, concise and consistent.

FIG. 1

In the first drawing, there is shown with a sectioned elevation, a separator tube 1, vertically oriented to receive a mixture of liquid and gas to be separated from each other. The mixture inlet 2 passes the mixture into some form of device 3 which spins, or vortexes, the mixture as it flows up into separator tube 1. Liquid separated from the gas is collected in gas-tight casing 4 in a collection 5. The liquid is withdrawn from collection 5 through outlet 6. The gas, separated from the liquid, leaves separator tube 1 at upper outlet 7.

Under the comcepts of the invention, the liquid entering at the bottom of tube 1 is forced into a layer on the internal wall of tube 1. This liquid flows through the openings 8 and falls into collection 5 in the bottom of casing 4. The novelty resides in the form, number, distribution, and size of openings 8 in the wall of tube 1 within the combination of FIG. 1.

This arrangement of structure, and its relation to the mixture of gas and liquid entering at 2, will function under the basic theory of operation set forth in the preceding general analysis section. The force upon the liquid will flow it through a number of the openings 8. The pressure within the casing 4 will substantially equal that pressure on the internal wall of separator tube 1. The result is that some gas will be forced through openings 8. Casing 4 is a dead end for this gas. The gas will naturally return to separator tube 1, either through the same opening through which it was forced, or a downstream opening. All of the gas will then flow from separator tube 1 at outlet 7. Any of the well-known mechanisms for withdrawal (not shown) will control liquid flowing from casing 4 through liquid outlet 6.

In full disclosure of the invention, the dimensions of the actual reduction to practice are re-emphasized, tube 1 may be formed of a light-gauge metal. It is in the specific form of a hollow cylinder, having a diameter of substantially 3". Of course, the invention is not limited to a tube of this size, but much meaningful performance data has been compiled in tests of this size tube. Its performance is well within the parameters ascribed to the basic concepts of the invention.

The heart of the matter is in the size, form and distribution of openings 8. In FIG. 1, these openings are simply indicated as rectangular slots, with the width of substantially ⅛". The number, length and distribution of the slots of FIG. 1 are to be taken in limitation of the invention. Subsequent drawing figures will contemplate their structure more specifically. The overall teaching is that the total length of these slots in a 3" tube is at least 100" in length to lift their function well above that of the prior art continuous gap.

The present invention is to be compared with that prior art which discloses continuous gaps in the walls of tubes. More specifically, the measure of the effective openings provided by the present invention is based on a single, continuous gap as disclosed by the prior art. The discovery of the invention is that at least 10 times the area provided by a single, continuous gap is required to attain the efficiency of separation desired. In making this comparison, it is emphasized that the continuous gap is accurately described as an interruption in the wall of a single tube within which the mixture of gas and liquid is vortexed, or the gap is accurately described as between two tube sections, axially aligned and spaced from each other to form the continuous gap. Thus, the prior art disclosing continuous gaps forms a base for defining the invention as embodied in gaps, or openings, at least ten times that provided by the single continuous gap of the prior art.

DISTRIBUTION, ARRANGEMENT AND NUMBER OF OPENINGS

FIG. 2

Figure 2:
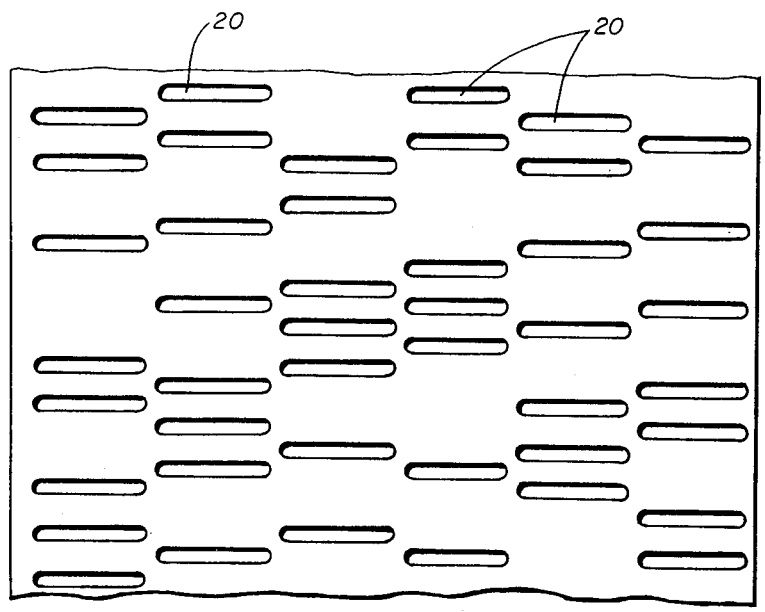
FIG. 2 is a sectioned elevation of the part of the separator tube having openings in the form of slots.

FIG. 2 discloses a form which is readily fabricated for openings in the separator tube. Given rectangular shape and with substantially $\frac{1}{8}"$ width, any desired number of slots 20 can be used to obtain the desired efficiency. If the more-or-less standard $\frac{1}{8}"$ width is used, the efficiency requirements may be conveniently established in terms of total length. As an example, a 3" separator tube will require a minimum of 100" of $\frac{1}{8}"$ width openings of this rectangular form.

The invention is not to be limited in any way to rectangular slots oriented in a plane normal to the axis of the separator tube. This arrangement is disclosed in FIG. 2 but it is no more limiting than the fact that the slots themselves are shown as rectangular in shape. The slots may be arranged as openings through the separator tube wall at an angle to a plane normal the axis of the separator tube. No evidence of significance indicates the functional advantage in separation if the slots are so arranged. However, the invention certainly contemplates the possibility that there may be at least some fabricating advantage of such arrangements.

Additionally, the slots are not regimented into sharp, cornered rectangles. It is well within the scope of the invention for the slots to have rounded end profiles to which the term "oblong" may be applied.

In FIG. 2, the openings are disclosed as formed in the tube wall developed in a plane. This drawing convention has the advantage of showing clearly the shape and arrangement of the openings, although obviously the view is of a flat sheet of material, which will be formed into the hollow cylinder of the separator tube.

FIG. 3

Figure 3:
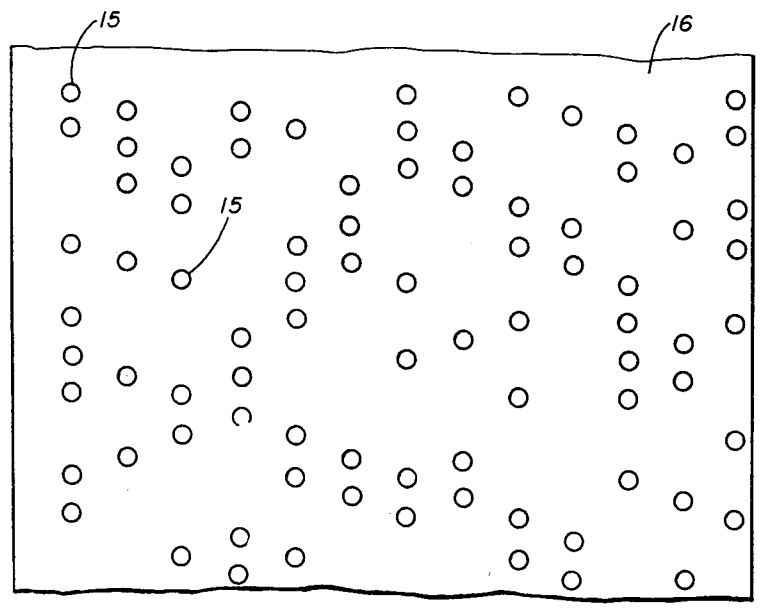
FIG. 3 is a sectioned elevation of a separator wall showing the openings in the form of holes.

FIG. 3 illustrates a circular form and scattered distribution of openings 15, in the wall 16 of a separator tube, similar to that of FIG. 1. This figure is offered simply to emphasize that the shape of the openings in the wall of the separator tube may vary from the shape of openings 8 disclosed in FIG. 1, and variations as discussed in connection with FIG. 2. For so long as the total area of openings falls within the size formulated within the concept, separation will be accomplished with the efficiency required.

As in FIG. 2, FIG. 3 discloses the developed wall of the separator tube. The wall is developed in a plane to disclose clearly that the openings 15 are circular. Again, the wall disclosed will be formed into a hollow cylinder for the tubular separator.

FIG. 4

Figure 4:
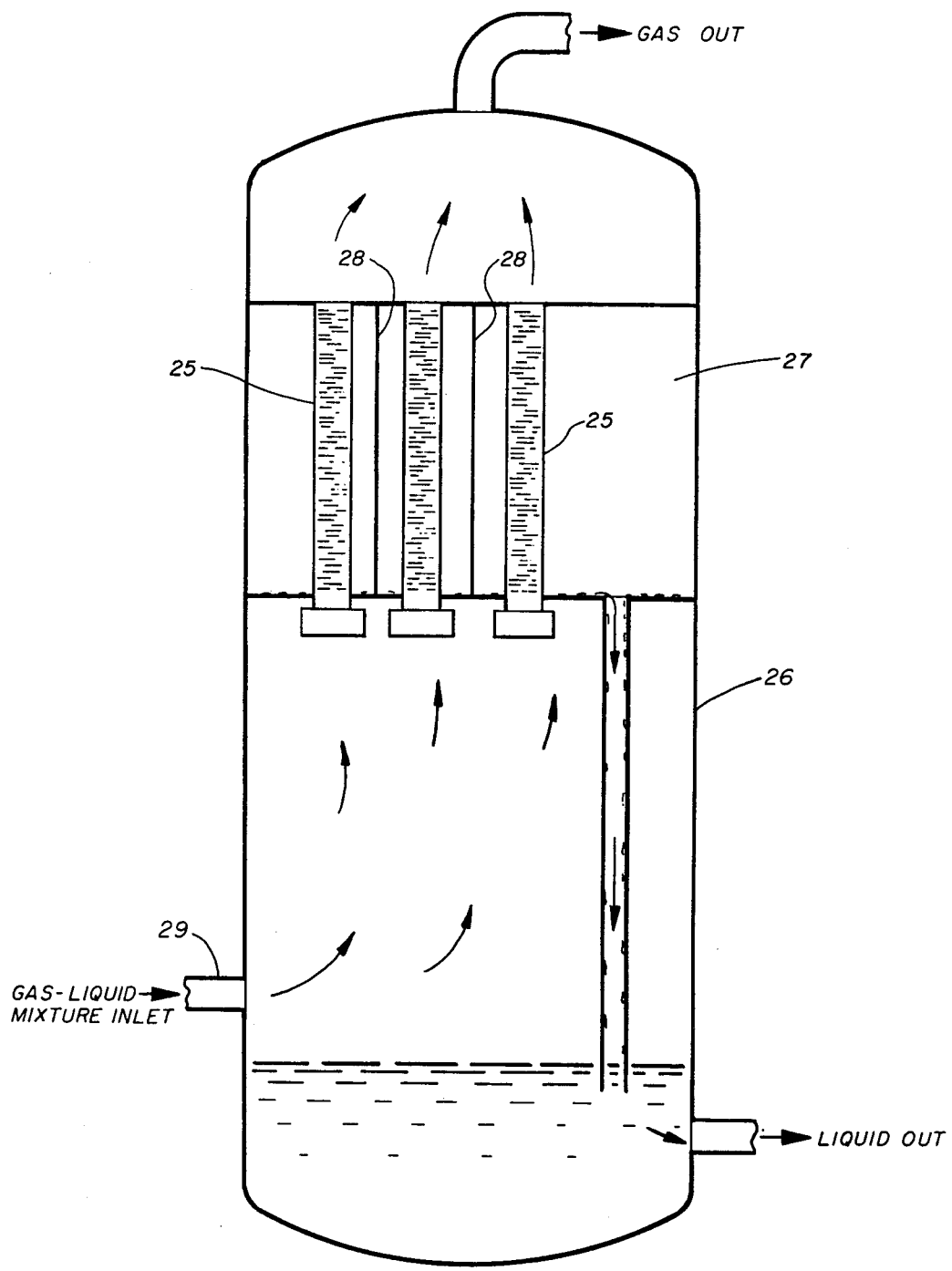
FIG. 4 is a sectioned elevation of a number of the separators of FIG. 1 mounted in a single casing.

FIG. 4 discloses a very practical embodiment of the invention, wherein a plurality of separator tubes are vertically mounted within a common gas-tight casing. Obviously, there are flow streams of liquid and gas, which require the gas capacity afforded by a number of tubes. Therefore, in FIG. 4, it is illustrated how a plurality of separator tubes 25 may be mounted in a vessel 26 with a common chamber 27, into which the separator tube wall openings eject their liquid loads. The mixtures of liquids and gas to be separated are to be introduced into vessel 26 through conduit 29.

There is a peculiar problem in the multi-tubular separator arrangement. If the individual tubes are spaced close to each other, the liquid ejected through the wall openings of one tube will contact the wall of an adjacent tube. The natural flow of carrier gas of the tube wall openings will re-entrain such liquid and carry it back into the interior of the tube. Obviously, a path must be provided for the liquid emitted from all tubes to enable the liquid to gravitate to a lower collection of the liquid in chamber 27.

Strategically placed solid baffles 28 are positioned between adjacent separator tubes 25 to form intercepting and drainage surfaces for liquid ejected from the separator tubes. It is anticipated that any liquid from the tubes landing upon the surface of baffles 28 will flow downward on that surface to join the lower liquid collection.

Little imagination is required under the guidelines of the disclosure to conclude that the invention is not limited to a vertical orientation of the separator tubes 25. The present embodiment is the vertical arrangement disclosed, but it is readily conceivable that the overall design could require horizontal orientation of similar separator tubes. Further, it should now be apparent that a separator tube orientation, other than vertical, will require modification of the baffles between the tubes, in order that the baffles function as contact and drainage surfaces for the liquid discharged from the separator tubes.

GRAPHED PERFORMANCE

FIG. 5

Figure 5:
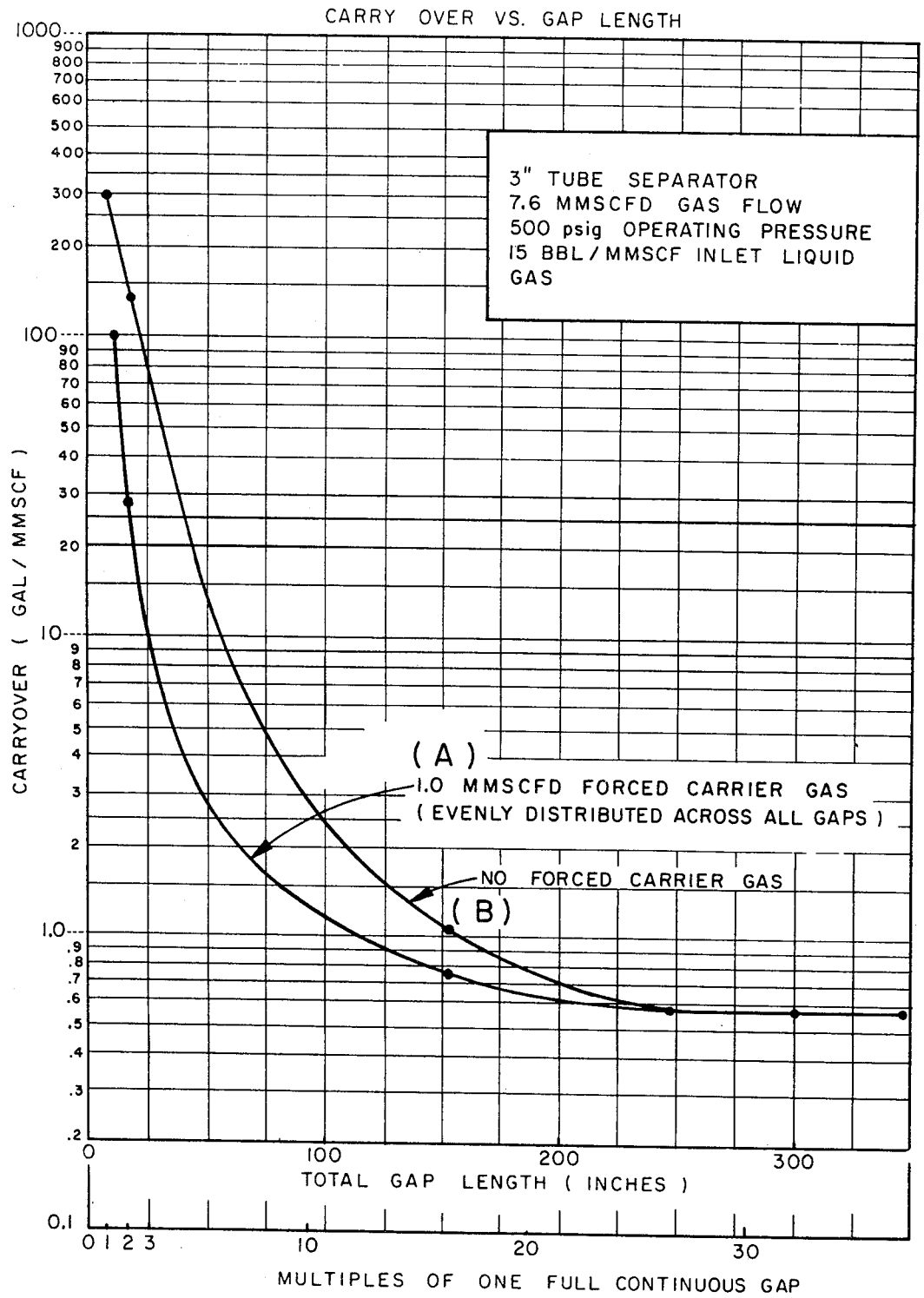
FIG. 5 is a graphical representation of the carry-over of liquid from the cylindrical, tubular separators with various gap lengths.

FIG. 5 is a graphical plot, with which the carryover liquid output of a hollow cylindrical separator is compared with tube wall slots of various total lengths. The data is stabilized with a 3" diameter separator tube and slot-shaped openings substantially $\frac{1}{8}"$ in width.

The contrast between the prior art performance, using recombined forced carrier gas and non-recirculated natural carrier gas flow, is shown by plots A and B. Plot A shows the variation of carryover, with a specified amount of forced carrier gas, which is recombined with the main flow, and plot B shows the variation of carryover, with only natural carrier gas.

The first abscissa of the graphical plot is simply in terms of total length of $\frac{1}{8}"$ width slots. The second abscissa is in terms of multiples of the length of a continuous gap opening in the wall.

First, it is evident that the use of the forced carrier gas recombination system does have a range of performance better than the natural carrier gas flow system. However, the differences diminish as the gap length increases. Most significantly, the gap length of 100" and above shows a tremendous decrease in carryover, compared with the prior art 1, 2, 3 continuous gaps. Also, at this point of gain, in the diminishment of carryover, the multiple of ten becomes significant. The conclusion is that in the 3" diameter tube, the data clearly supports 100" and above with the total gap length as the tremendous gain with the present invention. Companion to this data is the multiple of ten of the single, continuous gap type openings. The gain does level off. The gap of FIG. 5 evidences this gain as being substantially constant from 200", or a 20 one-gap multiple and beyond. In this region, it is to be noted that the use of recombined forced carrier gas makes no significant difference.

FIG. 6

Figure 6:
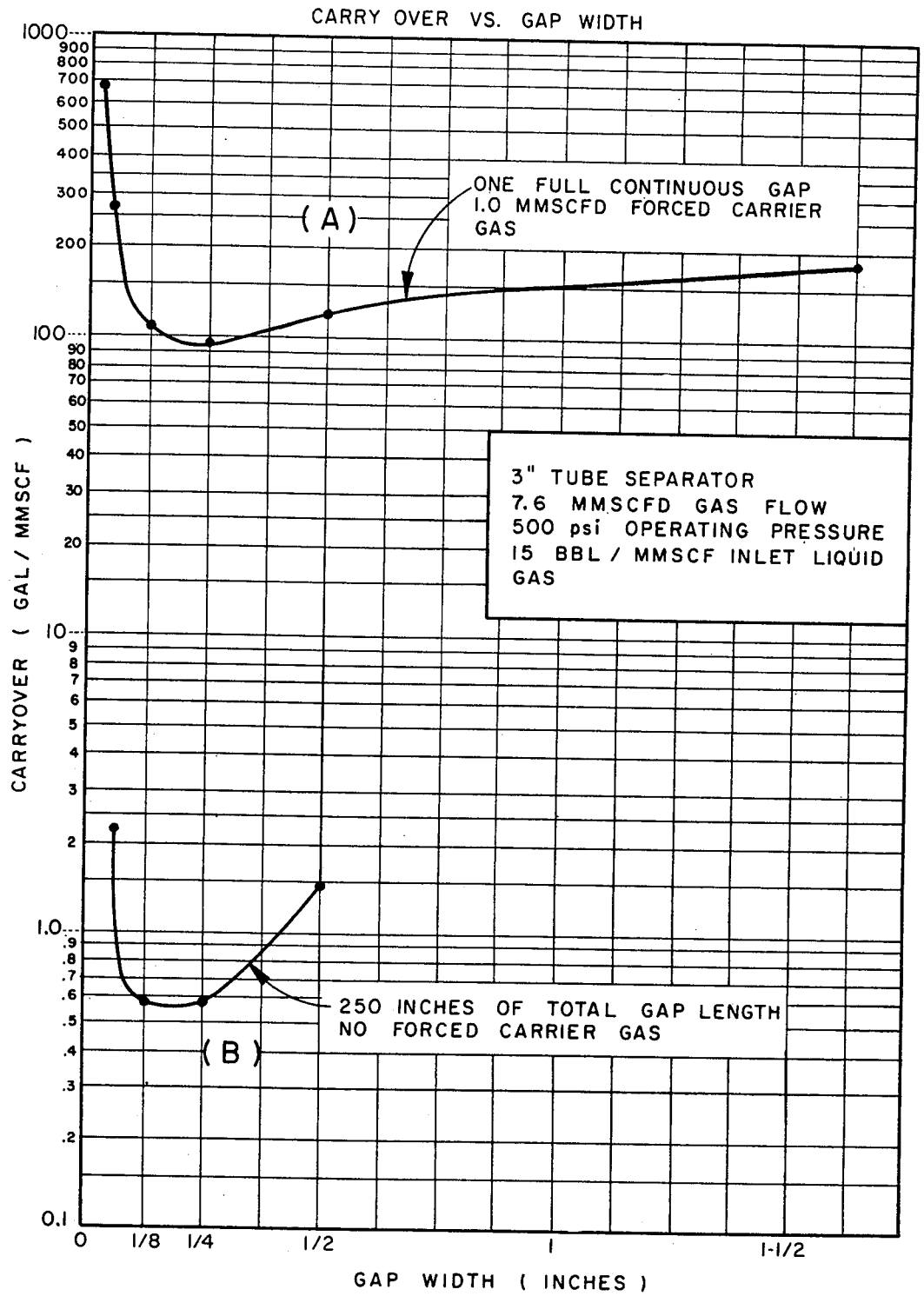
FIG. 6 is a graphical plot of carryover from a 3" diameter tubular separator with various gap widths.

FIG. 6 gives further data, which binds the concept more tightly to the actual reduction to practice. In this graph, carryover is now plotted against variations of gap width. Again, the 3" diameter separator tube performance is analyzed. Plot A shows the carryover variation and the single, continuous gap width is varied over a range including ⅛" to ½". Obviously, the best performance of the one-gap system is in the ⅛" to ¼" range. Plot B of the graph of FIG. 6 shows the carryover performance of 250" total length gap system with widths varied to include ⅛" to ½". Obviously, the ⅛" to ¼" range has the better performance.

CONCLUSION

The scope of the invention becomes more evident with each piece of data accumulated. Logically, the invention was grounded upon the testing of the prior art under practical field conditions. Surprising deficiencies were uncovered. It suddenly became evident that the stepped gap system, or any other 1, 2, 3 gap system, was not as good as had been assumed. The assumption that the addition of one or two extra continuous gaps could be provided in the series with the original gap has never been seriously questioned by data taken at elevated pressures. While these old ideas crumbled, new concepts took their places.

Under the new concepts, a great leap forward was made in the total area of openings provided in the walls of the tubular separator. Surprisingly enough, this area expansion attained a significant improvement at ten times the old single, continuous gap area. Of course, the formulation of this improvement, in terms of total gap lengths, was simply an alternate expression of the area to be provided by the openings in the separator wall.

At the same time the tube wall opening area was being expanded, it was discovered that the need to recombine the carrier gas was anachronistic. Another long-held belief tumbled. The promise of simplification resides in the concept that forced carrier gas routes need not be provided.

From the foregoing, it will be seen that this invention is one well adapted to attain all of the ends and objects hereinabove set forth, together with other advantages which are obvious and inherent to the method and apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

The invention having been described, what is claimed is:

1. A liquid-gas separator, including,
    a tube adapted to receive in its first end a gas in which liquid is entrained,
    means at the first end of the tube for forming a vortex of the liquid and gas entering the first end of the tube which forces the liquid to the internal wall of the tube,
    elongated openings through the wall of the tube wherein each elongated opening has a width substantially ⅛" and is extended in a plane normal the axis of the tube and wherein the elongated openings are distributed along a substantial length of the tube and wherein the total area of all the openings is at least ten times that of the area of a continuous circumferential opening ⅛" wide through the wall of a tube of the same diameter,
    a casing sealed substantially gas tight to the external wall of the tube above and below the elongated openings through the tube wall and wherein the casing forms a chamber with the external tube wall in which the liquid passing through the elongated openings collects,
    the tube having a second end providing a gas outlet from which gas is withdrawn after the liquid has been forced through the tube wall openings,
    and a conduit connected to the chamber through which the liquids collected in the chamber are withdrawn.

2. The separator of claim 1, in which,
    each of the elongated openings through the tube wall is in the form of a rectangle.

3. A separator for mixtures of gas and liquid, including,
    a tube having a first end and a second end,
    a means at the first end of the tube for developing the force of a vortex on a gas in which liquid is entrained which flows into the first tube end,
    a multiplicity of elongated openings through the wall of the tube and wherein each elongated opening is in a plane normal the axis of the tube and wherein each elongated opening is substantially ⅛" in width and the total length of all the elongated openings is at least ten times the length of a continuous circumferential opening of substantially ⅛" width through the wall of a tube of the same diameter,
    a casing sealed substantially gas tight to the external wall of the tube above and below the openings in the tube wall and forming a chamber external the tube wall in which the liquid from the openings collects,
    and a conduit connected through the wall of the chamber through which the liquids collected in the chamber are withdrawn,
    whereby gas separated from the liquids is flowed from the second end of the tube.

4. The separator of claim 3, in which,
    each of the multiplicity of elongated openings through the wall of the tube is in the form of a rectangle.

5. A method for separating gas and entrained liquid with a tube having first and second ends and having elongated openings through the wall of the tube wherein each elongated opening has a width substantially ⅛" and is extended in a plane normal the axis of the tube and wherein the elongated openings are distributed along a substantial length of the tube and wherein the total area of all the openings is at least ten times that of the area of a continuous circumferential opening ⅛" wide through the wall of a tube of the same diameter, including, conducting gas and entrained liquid into the first end of the tube, vortexing the gas and liquid to force the liquid through the elongated openings in the wall of the tube, applying a pressure to the external surface of the tube which is substantially equal to the pressure inside the tube, collecting the liquid flowing through the wall openings of the tube, withdrawing the liquids from the collection, and withdrawing the gas from the second end of the tube.

* * * * *